W. F. COCHRANE.
BOLTING FLOUR.
No. 37,321. Patented Jan. 6, 1863.
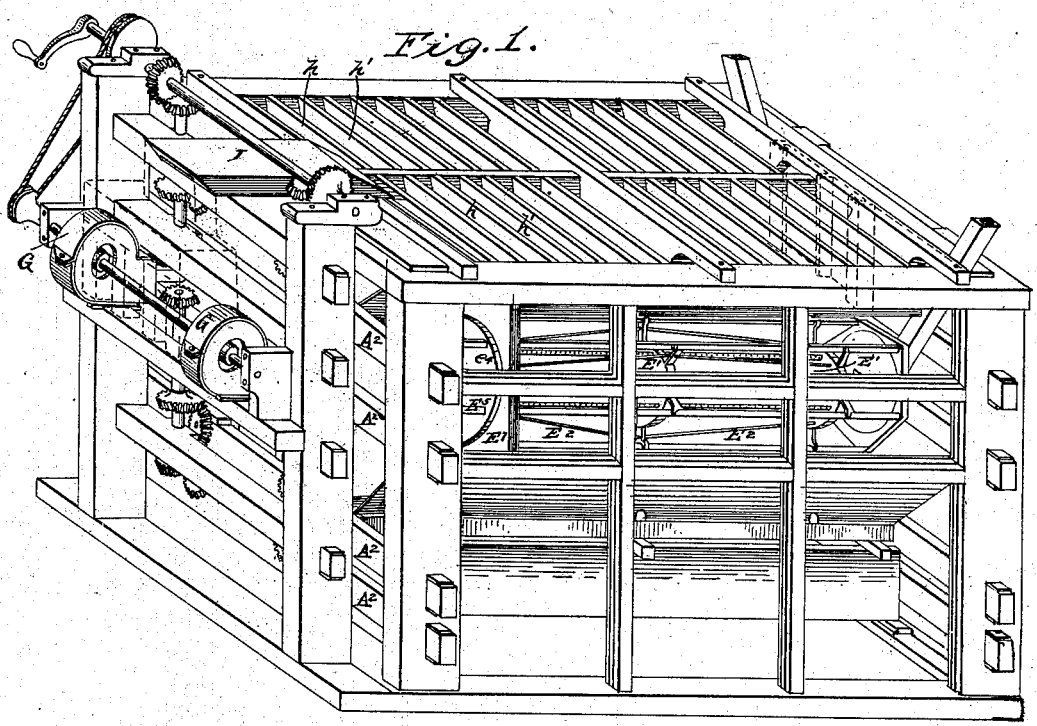
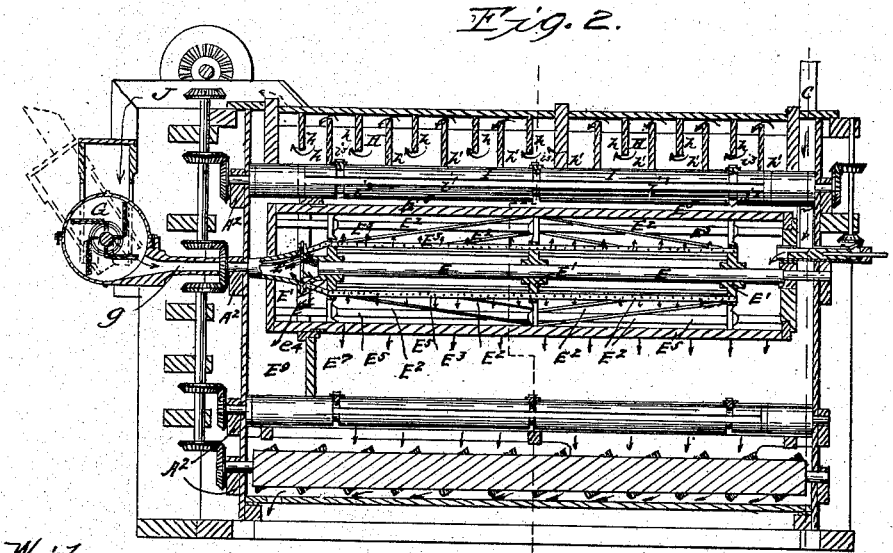

UNITED STATES PATENT OFFICE.

WILLIAM F. COCHRANE, OF SPRINGFIELD, OHIO, ASSIGNOR TO HIMSELF AND WARDER & CHILD, OF SAME PLACE.

IMPROVEMENT IN BOLTING FLOUR.

Specification forming part of Letters Patent No. 37,321, dated January 6, 1863.

*To all whom it may concern:*

Be it known that I, WILLIAM F. COCHRANE, of Springfield, in the county of Clark and State of Ohio, have invented certain new and useful Improvements in Bolting-Chests for Flouring-Mills, (Case E,) of which the following is a full, clear, and exact description, reference being had to the accompanying drawings, which make part of this specification, and in which—

Figure 1 represents a view in perspective of a bolting-chest embracing my improvements, as seen from that end to which the driving-gearing is attached, the panels which inclose the chest being removed to show the mechanism within; and Fig. 2, a vertical longitudinal section through the center of one of the chests, the mechanism being shown partly in section and partly in elevation.

The mode of bolting flour ordinarily used in mills as heretofore constructed is attended by various difficulties. The meal, when first ground, is always hot, and often damp, the heat being caused by the friction of the stones and the dampness by the moisture absorbed by the grain previous to the grinding. The bolting-cloth generally used is made of threads of silk covered with gum, in order to form a smooth, polished surface, so that the flour will pass freely through the fine meshes of the cloth. The dampness and heat of the meal have a tendency to soften and dissolve this gum, and make, instead of a polished surface to the thread, a sticky one, to which the particles of flour adhere, and thus close and clog the meshes of the cloth, and also to cause the threads to swell, consequently decreasing the size of the pores. Without ventilation the air confined in the bolting-chests soon becomes heated and surcharged with moisture, which condenses upon the sides of the chest exposed to the influence of the outer atmosphere, thus causing the flour to "dough" or clog the spouts.

My invention has reference to that class of bolting chests in which atmospheric pressure is employed to facilitate the process of bolting. The plan I pursue is to pass a strong current of air into the interior of the reels, cooling or warming the meal as the condition of the external atmosphere indicates to be most proper, thence through the meshes of the cloth, keeping the gum on the cloth cool and hard, and carrying with the current of air all particles of flour which have a tendency to "cloud" the cloth, thus keeping it free and open, and also carrying out of the chest the overheated atmosphere. Were the blast permitted to escape directly into the open air after passing through the reel-chamber, much fine flour in the form of dust would be carried off by it and wasted.

It is the object of my invention to prevent this waste; and to this end the improvements claimed under this patent consist, first, in arranging a ventilator or condensing-chamber above the bolting-chest, through which the blast passes after leaving the bolting-chest, and in which the fine flour suspended in the blast-air is deposited; secondly, in combining with the condensing-chamber a valve, which permits the fine flour to escape without the blast escaping with it; thirdly, in combining a collecting-chamber, a valve, and a bolting-reel in such manner that the fine flour deposited in the chamber may be returned to the reel-chamber without the return of the air.

To carry out the objects of my invention in the most perfect manner, I have found it necessary to remodel almost entirely the bolting-chests heretofore used. I construct the frame of the bolting-chest of stout timbers, united by mortises and tenons, and held together by screws or bolts in such manner as to admit of their being readily taken apart or put together again. Above the chest I construct a chamber, extending the whole length of the frame. This chamber is divided into numerous cells or compartments by means of transverse partitions, having alternately open spaces at top and bottom. As the air escapes from the reel, it enters this chamber and passes through each of the cells, being alternately deflected upward and downward by the partitions in order that the fine flour carried off from the reel-chamber by the blast may be deposited. A pump or valve in the bottom of the chamber discharges the fine flour thus deposited either directly into a trough or into the reel-chamber, without in either case permitting the return or escape of the blast through the valve.

In the accompanying drawings, which represent a convenient arrangement of parts for carrying out the objects of my invention, my improvements are shown as applied to a bolting-chest consisting of two reels arranged side by side. As the construction is the same in both, a description of one will be sufficient. The reel, in this instance, extends the whole length of the chest, and turns freely in bearings in the bridge-trees $A^2$. The central shaft, E, upon which the reel is supported, is solid, except at the end nearest the driving-gear, which end is hollow and bell-shaped inside the bearing. Heads or spiders $E'$ are arranged upon the shaft E at right angles thereto, and are firmly braced and united by tie-rods $E^2$. A series of perforated tubes are arranged around the central shaft. These tubes $E^3$, in this instance, are open at one end only, these open ends being inserted into the bell-mouth $E^4$. The bolting-cloths are secured to ribs $E^5$, inserted into slots in the reel-arms $E'$.

Air is supplied to the reel in the following manner: The end of the reel-shaft nearest the driving-gear is hollow, and forms a close joint with the end of an air-tube, $g$, leading from a fan, G. The shaft revolves freely, but the air-tube is stationary. The reel-chamber is divided into two compartments of unequal size by a partition, $E^7$, which encircles the reel, and fits snugly on a flanged ring, $e^4$, upon it. The larger of these two compartments is for the reception of the fine flour which passes through the bolting-cloths, while the smaller one forms a dead-air chamber, $E^9$, into which the tailings or offals fall, a portion of the tail-end of the reel being left open for that purpose. The collecting-chamber H is divided into a number of compartments or cells by means of the transverse partitions $h\ h'$. The partitions $h$ fit closely to the top of the chest, but do not extend quite to the bottom of the chamber, while the others, $h'$, are secured to the bottom, and do not reach the top, their lower edges being inserted into grooves in the valve-shaft I. The current of air passes from the bolting-chamber through an opening behind the spout C, which feeds the reel, and enters the collecting-chamber, through which it passes, being alternately deflected upward and downward by the partitions $h\ h'$, thus forming eddies, which cause the flour or dust to settle in the cells upon the valve-shaft I, by which it is discharged. The valve I, in this instance, consists of a rotating shaft, fitting accurately and turning freely in two concave blocks, whose inner sides are curved to suit it. The shaft I has a long slot cut entirely through it, into which a board, $i'$, fits. The width of this board is somewhat less than the diameter of the shaft, and it fits closely in the slot, but is free to reciprocate transversely in it. Shallow annular channels or grooves $i^2$ are cut into the shaft at intervals. Brackets $i^3$, curved on their under side, near their centers, to correspond with the grooves $i^2$, are secured upon the base-boards or concave blocks, and serve to hold the shaft and blocks together and as a guide or cam to work the reciprocating board or plunger $i'$. The arrangement of the brackets is such that when the plunger-board $i'$ is vertical a cavity or channel in which the fine flour is deposited is left in the upper side of the shaft; but when the shaft revolves the board is pressed down, leaving a similar channel on the upper side, now uppermost, and forcing out the fine flour into a trough or conveyer below through an opening between the concave blocks. In the present instance, however, for convenience of construction, the fine flour thus collected is dropped by the valve directly into the reel-chamber, where it mingles with the other flour. After passing the whole length of the collecting-chamber the current of blast-air may enter the air-trunk J, which leads to the fan G, and again be returned to the reel, or it may be permitted to escape at once to the open air. In the drawings, the red arrows indicate the course taken by the flour in its passage through the chest, the blue arrows the current of air, and the black arrows the course of the offal.

It is deemed unnecessary to describe in detail the construction and operation of the other parts of the mechanism, as they form no part of the subject-matter herein claimed, and are, moreover, fully described in other applications filed simultaneously with this, and marked, respectively, "A," "B," "C," and "D."

What I claim under this patent as my invention is—

1. The condensing or collecting chamber H, when constructed, arranged, and operating as described, for the purposes specified.

2. The combination of a collecting-chamber, H, and valve I, substantially in the manner herein described, for the purpose set forth.

3. The combination of a collecting-chamber, a valve, and a bolting-reel, substantially in the manner and for the purpose described.

In testimony whereof I have hereunto subscribed my name.

WILLIAM F. COCHRANE.

Witnesses:
S. A. BOWMAN,
WARDER CUMMING.